United States Patent
Bulgrien et al.

(10) Patent No.: US 6,880,393 B2
(45) Date of Patent: Apr. 19, 2005

(54) DETECTING CLUTCH SLIPPAGE TO MEASURE DRIVE LINE TORQUE FOR CLUTCH CONTROL DURING POWER SHIFTS

(75) Inventors: Garth H. Bulgrien, Ephrata, PA (US); Yanming Hou, Racine, WI (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/601,781

(22) Filed: Jun. 23, 2003

(65) Prior Publication Data

US 2004/0255654 A1 Dec. 23, 2004

(51) Int. Cl.$^7$ ............................................. G01M 13/02
(52) U.S. Cl. ...................................................... 73/118.1
(58) Field of Search ............................... 73/116, 117.2, 73/117.3, 118.1, 119 R; 340/438, 439, 441, 453; 701/29, 67

(56) References Cited

U.S. PATENT DOCUMENTS

| | | | |
|---|---|---|---|
| 5,046,176 A | 9/1991 | Lin | 364/424.1 |
| 5,109,696 A * | 5/1992 | Bright et al. | 73/118.1 |
| 5,211,079 A * | 5/1993 | Runde et al. | 477/61 |
| 5,251,132 A * | 10/1993 | Bulgrien | 701/67 |
| 5,333,709 A | 8/1994 | Bulgrien | 74/335 |
| 5,487,004 A | 1/1996 | Amsallen | 364/424.1 |
| 5,580,332 A | 12/1996 | Mitchell et al. | 477/143 |
| 5,778,329 A | 7/1998 | Officer et al. | 701/55 |
| 5,950,789 A | 9/1999 | Hosseini | 192/85 R |
| 6,007,458 A | 12/1999 | Ohashi et al. | 477/154 |
| 6,193,630 B1 * | 2/2001 | Janasek et al. | 477/156 |
| 6,435,049 B1 | 8/2002 | Janaset et al. | 74/355 |
| 6,560,549 B1 * | 5/2003 | Fonkalsrud et al. | 702/41 |

* cited by examiner

Primary Examiner—Eric S. McCall
(74) Attorney, Agent, or Firm—Collin A. Webb; John William Stader

(57) ABSTRACT

A method for controlling clutch pressures during power shifts involving detecting clutch slippage, utilizing individual pressure control. In the shift, the pressure in the off-going clutch is ramped down over a time interval, for instance, an interval of from about 0.10 seconds to about 0.15 seconds, while the ratio of input speed to output speed is determined at more frequent intervals, such as about 0.01 second intervals, such that torque can be determined as a function of the clutch slippage. The speed ratio is checked frequently, for instance, 10 to 15 times during the ramp down of clutch pressure, resulting in 10 to 15 measured torque levels, to allow more precise adjustment of pressure in the off-going clutch, as well as the on-coming clutch.

9 Claims, 3 Drawing Sheets

DETECTING CLUTCH SLIPPAGE TO MEASURE DRIVE LINE TORQUE FOR CLUTCH CONTROL DURING POWER SHIFTS

TECHNICAL FIELD

This invention relates generally to methods and apparatus for controlling clutches during power shifts, and more particularly, to a method and system for clutch control utilizing detection of clutch slippage to measure drive line torque for determining the required or desired clutch pressure curve.

BACKGROUND ART

To achieve a smooth power shift when more than one clutch is involved, the pressure versus time signature or profile curve for the clutches must be varied according to the torque transmitted by the transmission. Referenced in this regard Bulgrien U.S. Pat. No. 5,251,132, issued Oct. 5, 1993 to Ford New Holland, Inc., which discloses controlling clutch pressure based on output shaft speed. Essentially, according to that patent, one clutch is released, and pressure is adjusted in the corresponding on-coming clutch based on the rate at which the output speed drops. However, it has been found that controlling clutch pressure based on output shaft speed results in less than desirable levels of smoothness in shift. The output speed can also be allowed to drop too fast or too far for the control system to react and increase pressure in the on-coming clutch.

Thus, what is sought is a new method for measuring drive line torque for clutch control during power shifts which provides better reaction ability and smoother shifting.

SUMMARY OF THE INVENTION

According to the invention, a method for controlling clutch pressures during power shifts involving detecting clutch slippage, is disclosed. According to one preferred method of the invention, individual pressure control for each clutch is utilized, and the pressure in the off-going clutch is ramped down over a time interval, preferably an interval of from about 0.10 seconds to about 0.15 seconds, while the ratio of input speed to output speed is determined at more frequent intervals, such as about 0.01 second intervals, such that torque can be determined as a function of the clutch slippage. The speed ratio is checked frequently, for instance, 10 to 15 times during the ramp down of clutch pressure, resulting in 10 to 15 measured torque levels, to allow more precise adjustment of pressure in the off-going clutch, as well as the on-coming clutch, as desired or required to provide sought after shifting characteristics, such as smoothness.

Because clutch slippage is detected while the clutch still has substantial torque capacity, smoother shifts can be made.

DETAILED DESCRIPTION OF THE INVENTION

Figure 1:
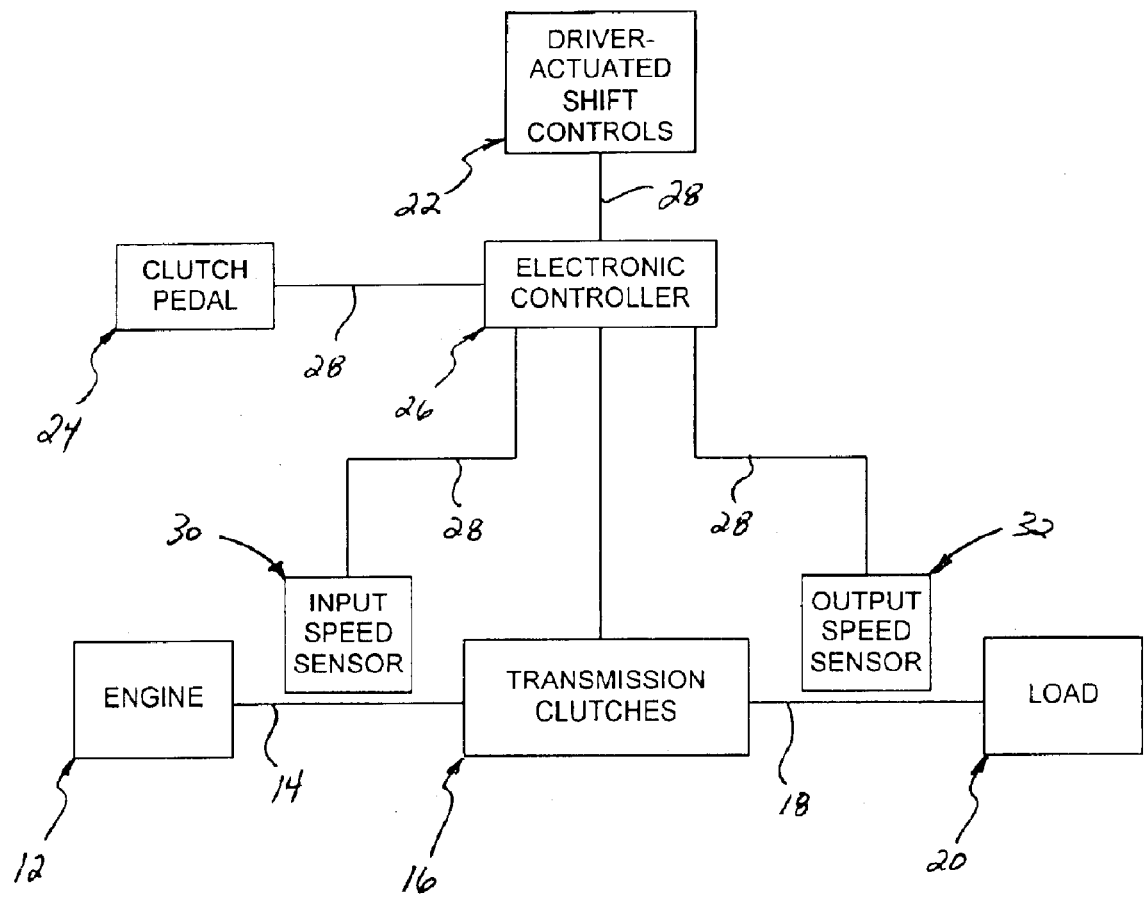
FIG. 1 is a simplified schematic diagram of an engine and driveline according to the invention.

Referring now to the drawings wherein aspects of a preferred method according to the invention are shown, in FIG. 1, a schematic representation of an engine and driveline 10 for a vehicle such as a work machine, and more particularly, a tractor, is shown. Engine and driveline 10 generally includes an engine 12 connected in rotatably driving relation to a transmission input 14. Input 14 is connectable by engagement of a plurality of transmission clutches 16, respectively, through a corresponding plurality of gear arrangements (not shown) in rotatably driving relation to a transmission output 18. Each gear arrangement provides a different ratio of driving speed to driven speed, such that when each of the respective clutches is engaged, output 18 will rotate at a predetermined ratio to input 14 which will be different than the ratio when the others of the clutches are engaged. Transmission output 18 in turn is connected in rotatably driving relation to a load 20, which can be for instance one or more drive wheels of the vehicle.

Typically, for power/shifting between two gears, whether under load or not, a first one of the clutches, denoted here as the off-going clutch, is disengaged, and a second one of the clutches, denoted as the on-coming clutch, is engaged, to complete the shift. The shift is initiated by the operator or driver using input devices such as a driver-actuated shift control 22 which can be, for instance, a movable shift lever or the like, and a clutch pedal 24. The respective operating states of control 22 and pedal 24 are communicated to an electronic controller 26, which includes a processor and appropriate circuitry for controlling the clutches, via suitable conductive paths 28 which can include wires or the like. Controller 26 is also connected by conductive paths 28 to an input speed sensor 30 positioned and operable for sensing the rotational speed of input 14, and an output speed sensor 32 positioned and operable for sensing the rotational speed of output 18. Both sensors 30 and 32 are operable for sending signals representative the sensed speeds to controller 26 in the well known, conventional manner.

The duration of the disengagement of the off-going clutch and the duration of the engagement of the on-coming clutch and the relative timing thereof are factors in determining the characteristics of the shift, including smoothness. The disengagement of the off-going clutch and the engagement of the on-coming clutch are fluid controlled operations, that is, each of the clutches contains fluid. Essentially, the fluid pressure in the off-going clutch is decreased to disengage it, and the pressure in the on-coming clutch is increased to engage it. To effect smooth disengagement of the off-going clutch it is desirable to reduce the fluid pressure gradually or in steps. The fluid pressure in the on-coming clutch can be increased gradually or in steps to effect smoother engagement. The relationship of fluid pressure in a clutch verses time can be plotted, and this plot or curve represents a signature of the relationship. Often, it is desirable to vary one or more characteristics of one or both of these curves, to improve one or more characteristics of a shift, for instance, smoothness.

The present invention involves a method for controlling clutch pressures during power shifts to provide desired shift characteristics, based on or as a function of detected clutch slippage. Individual pressure control for each clutch is utilized, and the pressure in the off-going clutch is ramped down over a time interval, preferably an interval of from about 0.10 seconds to about 0.15 seconds, while the ratio of input speed to output speed is determined at more frequent intervals, such as about 0.01 second intervals, based on sensed speeds from sensors 30 and 32. It has been observed that torque can be determined as a function of the clutch slippage. Thus, by determining ratios of input speed to output speed, clutch slippage can be determined, and from that data, torque can be determined. According to the invention, the speed ratio is checked frequently, for instance, 10 to 15 times during the ramp down of clutch pressure, including at times close to initiation of the ramp down, resulting in 10 to 15 measured torque levels. Using this data, precise adjustment of pressure in the off-going clutch, as well as the on-coming clutch, can be made as desired or required to provide sought after shifting characteristics, particularly smoothness. Because clutch slippage is detected while the clutch still has substantial torque capacity, it has been found that smoother shifts can be made.

Figure 2:
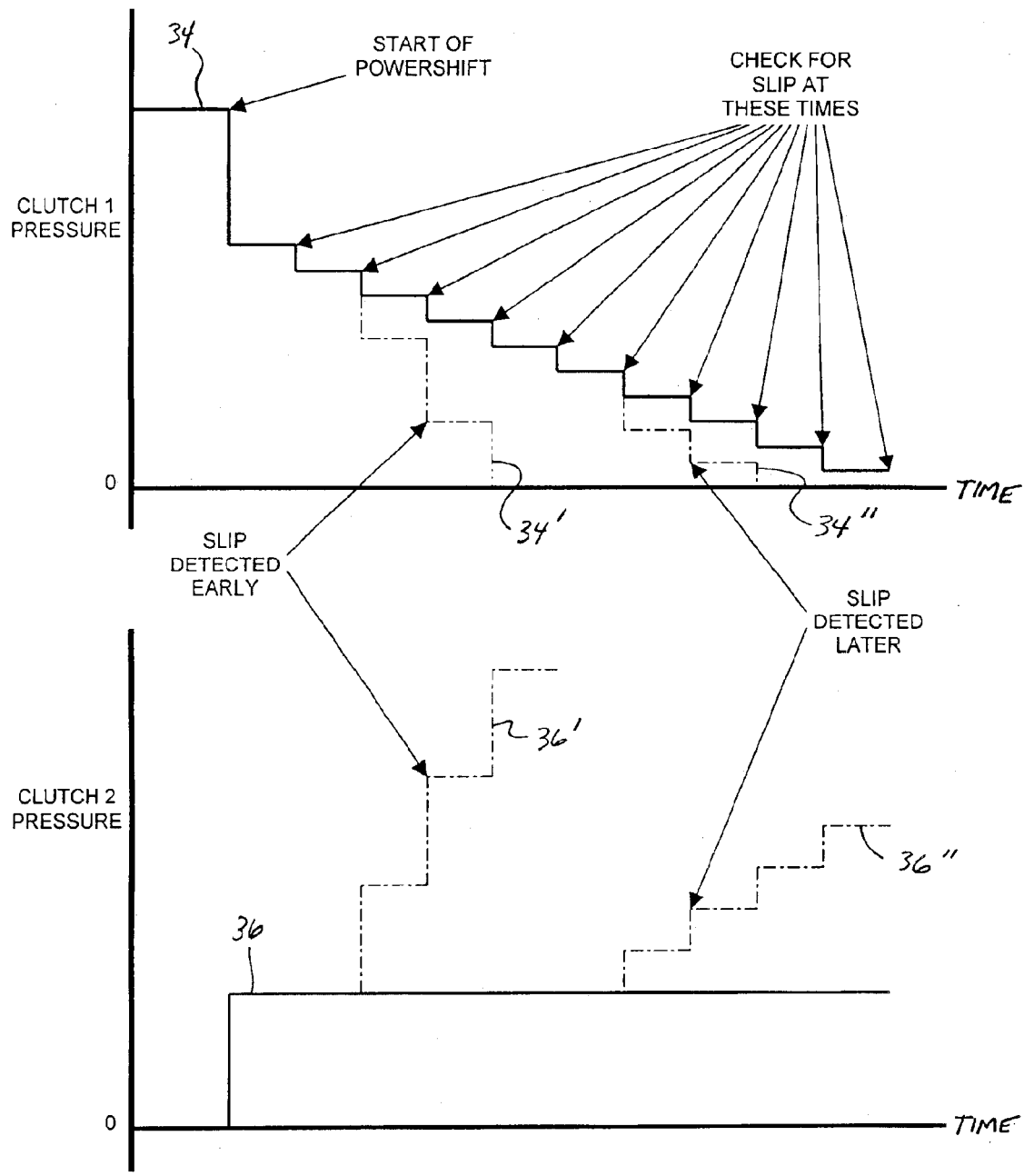
FIG. 2 is a graphical representation of pressure versus time profiles for an off-going clutch and an on-coming clutch, as functions of ratio of input speed to output speed as measured at frequent intervals.
Figure 3:
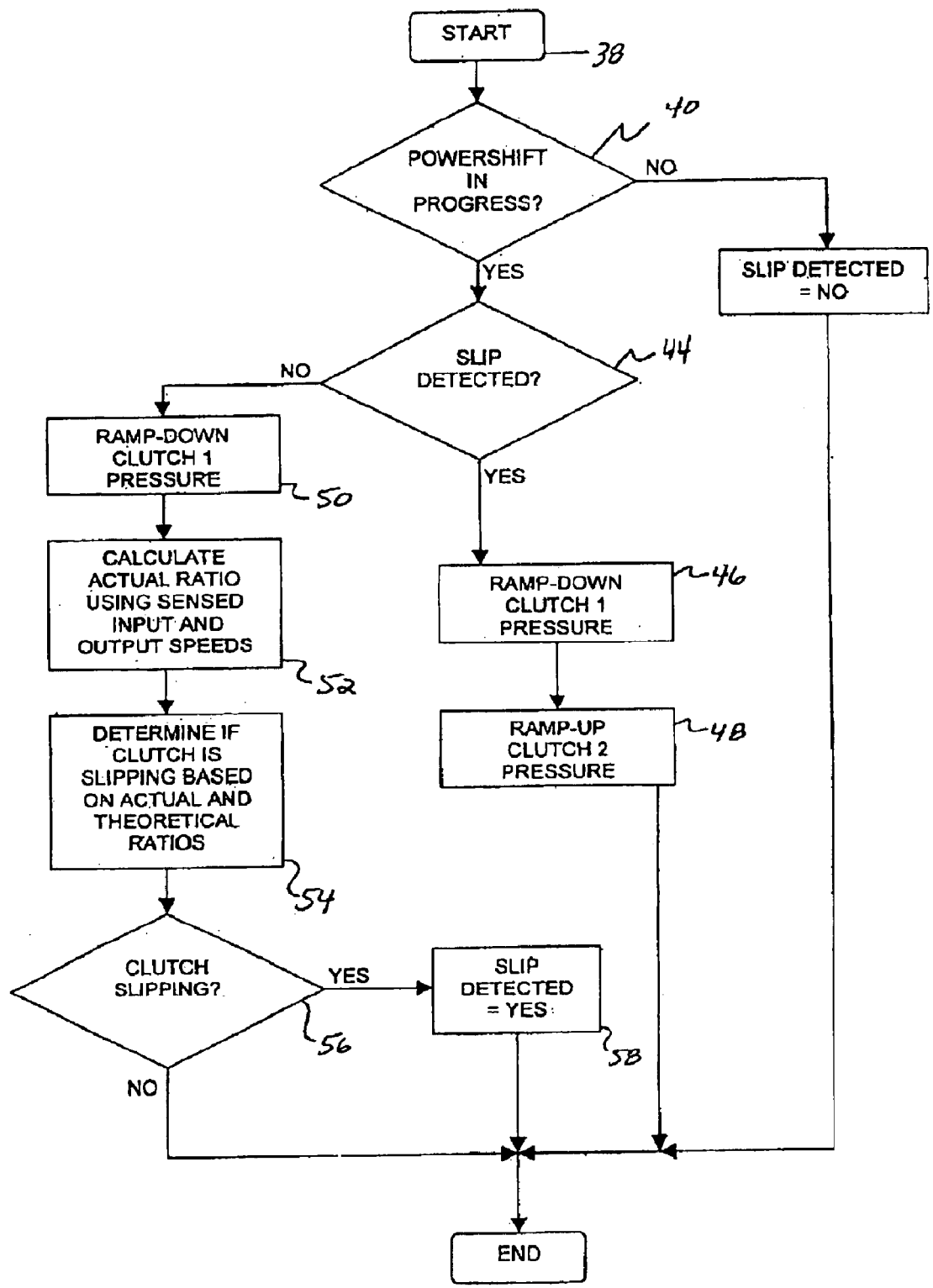
FIG. 3 is a high level flow diagram showing one method of clutch control according to the invention.

Referring also to FIGS. 2 and 3, representative characteristic or signature curves for an off-going clutch and an on-coming clutch for producing a smooth power shift, and steps of a method according to the invention for producing the curves, are shown. In FIG. 2, a plot of the fluid pressure over time for the off-going clutch, denoted as CLUTCH 1, is represented by trace 34, and a plot of the fluid pressure over time for the on-coming clutch, denoted as CLUTCH 2, is represented by trace 36. Both traces 34 and 36 have stepped shapes, as a result of pressure adjustments made responsive to detected slippages. Traces 34 and 36 can each have a range of shapes, including a shape having one slope earlier, and a different slope later, or a slope that changes at each or several intervals. This will typically be a function of the amount and timing of the detected slippage. As an example, trace 34 can be changed early from a default shape (thick line) upon detection of slippage to have a relatively steep downward slope, denoted by dotted line 34', or later to less steeper slope, as denoted by dotted line 34", or a range of slopes therebetween, depending on when slippage is detected and the magnitude of the slippage. The slope of line 34' is representative of slopes that can be expected when slippage is detected earlier, and the slope of line 34" is representative of slopes that can be expected when slippage is detected later, as noted. Similarly, trace 36 can have a range of shapes, including a segment having a relatively steep slope, as denoted by line 36', a more gradual slope, as denoted by line 36", or a range of slopes therebetween, depending on when and the magnitude of slippage detected. Again the slope of line 36' is representative of slopes that can be expected when slippage is detected earlier, and the slope of line 36" is representative of slopes that can be expected when slippage is detected later, as also noted.

FIG. 3 is a block diagram of preferred steps of the method at the time intervals of FIG. 2. After initiation of the process at start block 38, it is determined whether a powershift is in progress, as denoted at decision block 40. If no slip is detected, the pressure change in the clutch or clutches will follow a default signature curve to the next interval. If slip is detected, as determined at decision block 44, CLUTCH 1 (off-going) pressure is ramped down, as denoted at block 46, and CLUTCH 2 (on-coming) pressure is ramped up, as shown at block 48. If, at decision block 44 slip is not detected, CLUTCH 1 pressure is ramped down as denoted at block 50, and an actual ratio of the sensed input speed and output speed is calculated, as denoted at block 52. It is then determined if the clutch is slipping based on the actual and theoretical speed ratios, as shown at block 54. At block 56, if slippage is detected, it is registered, as denoted at block 58. At the next interval, these steps can then be repeated.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method for controlling a clutch pressure during a power shift comprising the steps of:
   a.) changing a pressure in a first clutch over a predetermined first time interval while calculating a ratio of an input speed on an input side of the first clutch to an output speed on an output side of the clutch at predetermined second time intervals shorter than the first interval to determine whether the first clutch is slipping;
   b.) adjusting a rate of change of the pressure as a function of determined clutch slippage;
   c.) changing a pressure in a second clutch over the predetermined first time interval while calculating a ratio of an input speed on an input side of the second clutch to an output speed on an output side of the second clutch at predetermined second time intervals shorter than the first interval to determine whether the second clutch is slipping; and
   d.) adjusting a rate of change of the pressure in the second clutch as a function of the determined second clutch slippage.

2. The method of claim 1, wherein the first time interval is from about 0.1 to about 0.15 second, and the second time intervals are each from about 0.01 to about 0.015 seconds.

3. The method of claim 1, wherein the first clutch is an off-going clutch and the pressure therein is decreasing.

4. The method of claim 1, wherein the second clutch is an on-coming clutch and the pressure therein is increasing.

5. The method of claim 1, wherein a calculate ratio is compared with a theoretical ratio to determine clutch slippage.

6. The method of claim 1, wherein the first clutch is an off-going clutch and tho pressure therein is decreasing and the rate of decrease in the pressure therein is increased when clutch slippage is present.

7. The method of claim 1, wherein the second clutch is an on-coming clutch and the pressure therein is increasing and the rate of increase in the pressure therein is increased when clutch slippage is present.

8. The method of claim 1, wherein the first clutch is an off-going clutch and the pressure therein is decreased during the shift and the rate decrease is changed as a function of the determined first clutch slippage.

9. The method of claim 1, wherein the second clutch is an on-coming clutch and the pressure therein is increased during the shift and the rate of increase is changed as a function of the determined clutch slippage.

* * * * *